(12) United States Patent
Xiong et al.

(10) Patent No.: US 10,637,325 B2
(45) Date of Patent: Apr. 28, 2020

(54) COMPACT SERVO

(71) Applicant: UBTECH Robotics Corp, Shenzhen (CN)

(72) Inventors: Youjun Xiong, Shenzhen (CN); Yong Fu, Shenzhen (CN); Hongyu Ding, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 247 days.

(21) Appl. No.: 15/826,686

(22) Filed: Nov. 30, 2017

(65) Prior Publication Data

US 2019/0097491 A1 Mar. 28, 2019

(30) Foreign Application Priority Data

Sep. 28, 2017 (CN) .......................... 2017 1 0893849

(51) Int. Cl.
| | |
|---|---|
| *H02K 7/00* | (2006.01) |
| *H02K 11/30* | (2016.01) |
| *H02K 7/116* | (2006.01) |
| *H02K 5/26* | (2006.01) |
| *H02K 51/00* | (2006.01) |
| *H02K 7/08* | (2006.01) |

(52) U.S. Cl.
CPC .............. *H02K 7/003* (2013.01); *H02K 5/26* (2013.01); *H02K 7/116* (2013.01); *H02K 11/30* (2016.01); *H02K 51/00* (2013.01); *H02K 7/081* (2013.01); *H02K 2211/03* (2013.01)

(58) Field of Classification Search
CPC ...... H02K 7/081; H02K 7/116; H02K 7/1163; H02K 51/00

USPC .................................................... 310/83, 99
See application file for complete search history.

(56) References Cited

U.S. PATENT DOCUMENTS

| | | | | |
|---|---|---|---|---|
| 4,846,015 A | * | 7/1989 | Keppler ................... | B25J 9/102 74/665 GC |
| 2009/0039725 A1 | * | 2/2009 | Kanatani ................ | H02K 1/187 310/195 |
| 2012/0103127 A1 | * | 5/2012 | Liu ....................... | B25J 17/0283 74/490.06 |
| 2018/0112691 A1 | * | 4/2018 | Pettey ..................... | F16B 2/065 |

FOREIGN PATENT DOCUMENTS

TW 201127574 A1 * 8/2011 ................ B25J 9/06

OTHER PUBLICATIONS

Machine translation of TW 201127574 A1.*

* cited by examiner

*Primary Examiner* — Quyen P Leung
*Assistant Examiner* — Minki Chang

(57) ABSTRACT

A servo includes a housing, a motor, a printed circuit board (PCB) and a servo output shaft that are accommodated within the housing. The motor is electrically connected to the PCB. The housing has a lateral side defining a cutout. The servo further includes a gear transmission mechanism and an output arm. The gear transmission mechanism is used to connect a motor output shaft of the motor to the servo output shaft. The output arm has an end that is arranged within the housing at a substantially central position and connected to the servo output shaft, and another end extending out of the housing to connect with an external component.

9 Claims, 3 Drawing Sheets

COMPACT SERVO

CROSS REFERENCE TO RELATED APPLICATIONS

This application claims priority to Chinese Patent Application No. 201710893849.X, filed Sep. 28, 2017, which is hereby incorporated by reference herein as if set forth in its entirety.

BACKGROUND

1. Technical Field

The present disclosure generally relates to servos, and particularly to a servo having a compact structure.

2. Description of Related Art

Some conventional servos include a servo disc connected to an end of the output shaft. One problem with such configuration is that it is not conducive to the compactness of the servos.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
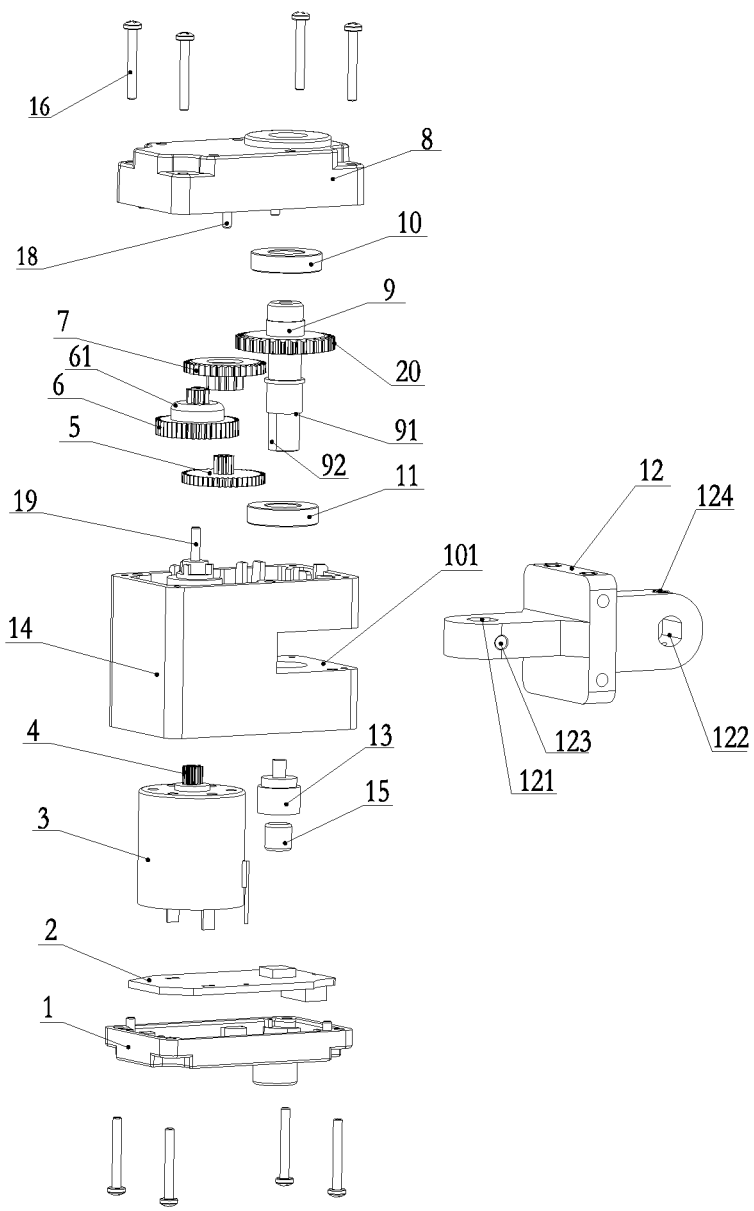
FIG. 1 is an isometric exploded view of a servo according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

In the description, relative terms such as "horizontal," "vertical," "up," "down," "top" and "bottom" as well as derivatives should be construed to refer to the orientation as then described or as shown in the drawing under discussion.

Figure 2:
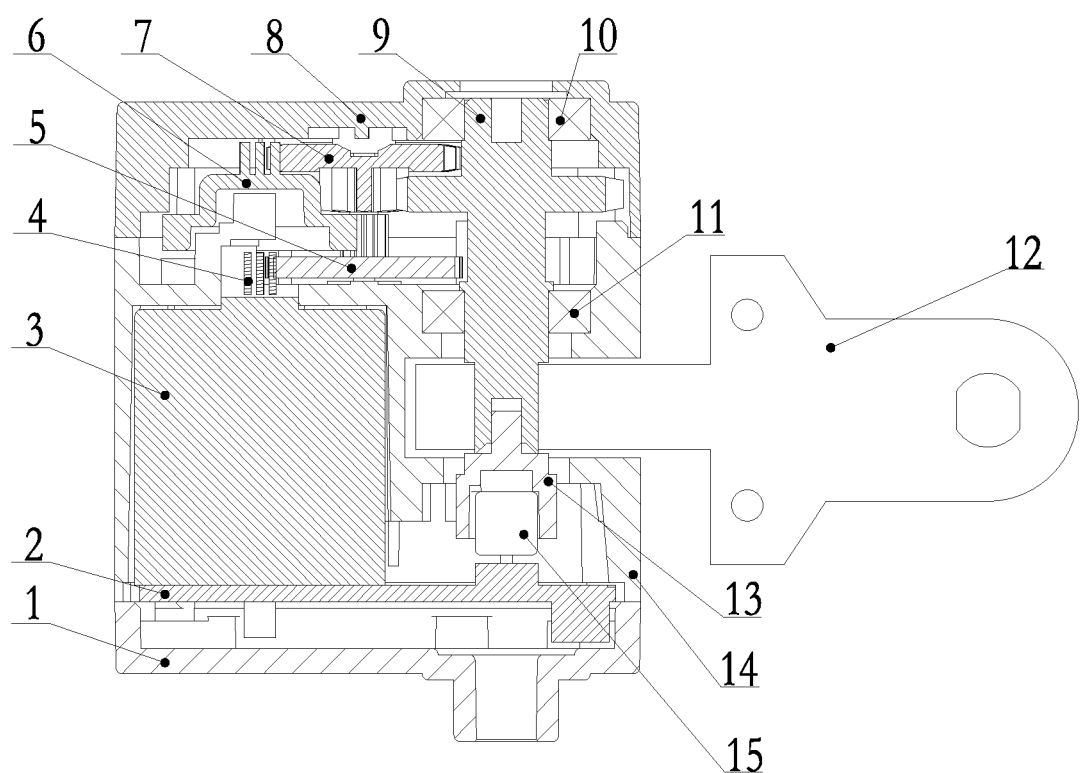
FIG. 2 is a sectional view of the servo of FIG. 1.
Figure 3:
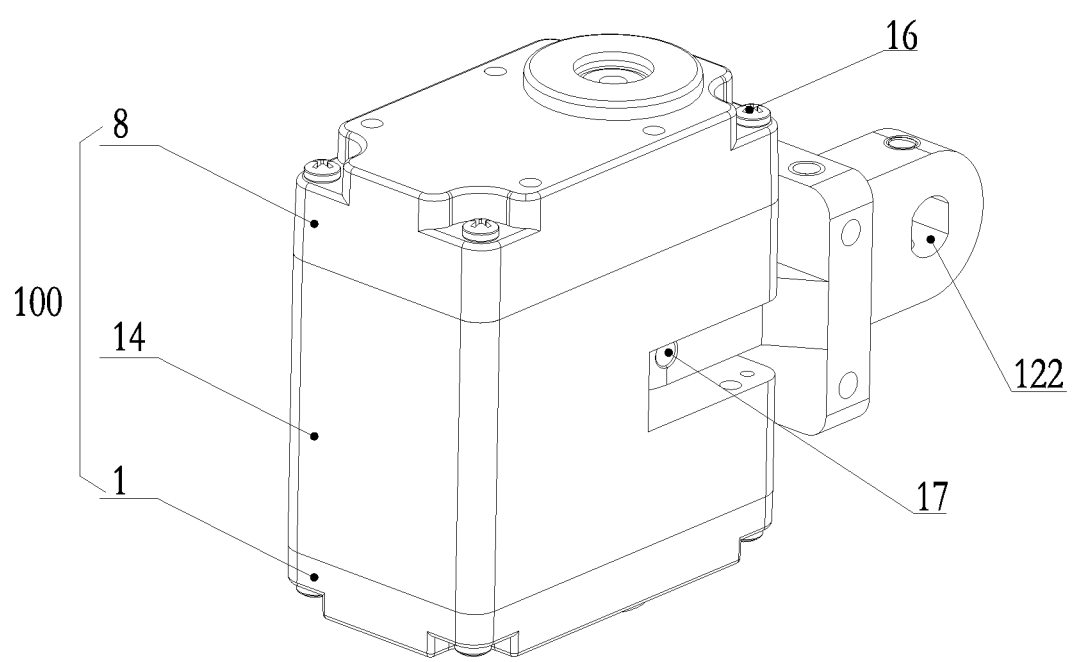
FIG. 3 is an isometric view of the servo of FIG. 1.

Referring to FIGS. 1-3, in one embodiment, a servo includes a housing 100, a motor 3, a printed circuit board (PCB) 2, a servo output shaft 9, a gear transmission mechanism, and an output arm 12 that are accommodated within the housing 100. The motor 3 is electrically connected to the PCB 2 and can operate when receiving an instruction from the PCB 2. The gear transmission mechanism is used to connect a motor output shaft of the motor 3 to the servo output shaft 9. The gear transmission mechanism is used to transmit the rotation of motor output shaft of the motor 3 to the servo output shaft 9. The output arm 12 includes an end that is arranged within the housing 100 at a substantially central position and connected to the servo output shaft 9, and another end extending out of the housing 100 to connect with an external component, which enables the output arm 12 to rotate together with the servo output shaft 9. In the embodiment, the motor 3 is soldered to the PCB 2.

Compared with some conventional servos, the servo of the present embodiment includes the output arm 12 having one end arranged within the housing 100 at a substantially central position and securely connected to the servo output shaft 9. One end of the output arm 12 away from the servo output shaft 9 is used to connect with other servos or components so that the overall structure of the servo is compact.

In one embodiment, the housing 100 includes a lateral side defining a cutout 101 at a substantially central portion of the lateral side. The lateral side is substantially parallel to the servo output shaft 9. The end of the output arm 12 is received in the cutout 101, and the output arm 12 is rotatable about an axis, and the axis is either same as the servo output shaft 9 or parallel to the servo output shaft 9, which saves the connection space between the output arm 12 and the housing 100, and makes the overall structure of the servo compact. The depth and height of the cutout 101 is determined according to the length and thickness of the portion of the output arm 12 that is received in the housing 100. In the embodiment, the cutout 101 has a width the same as the width of the housing 100. That is, the cutout 101 forms three openings in three sides of the housing 100, which allows the output arm 12 to rotate in a range of close to 180 degrees. In the embodiment, the distance between the top of the cutout 101 and the top of the housing 100 is substantially equal to the distance between the bottom of the cutout 101 and the bottom of the housing 100. The height of the cutout 101 is slightly larger than the thickness of the portion of the output arm 13 that is received in the cutout 101 so as to allow the output arm 12 to rotate freely.

In one embodiment, the end of the output arm 9 that is received in the cutout 101 defines a through hole 121 that allows the servo output shaft 9 to pass therethrough. Specifically, one end of the servo output shaft 9 is received in the through hole 121. The end of the output arm further defines a locking hole 123 intersecting and communicating with the through hole 121. The locking hole 123 extends along a direction that is perpendicular tot the extending direction of the through hole 121. The servo further includes a fastening member 17 that is received in the locking hole 123 to fix the output arm 12 to the servo output shaft 9, which allows the output arm 12 to be rotatable together with the servo output shaft 9. The fastening member 17 can be a screw. In the embodiment, the through hole 121 extends from one side surface to an opposite side surface.

In one embodiment, the lower portion of the servo output shaft 9 includes a lateral surface that including a cylindrical surface and a flat surface 92. The through hole 121 is shaped and sized to match the lower portion in such a way that the output arm 12 is rotatable together with the servo output shaft 9. Specifically, the inner lateral surface of the through hole 121 includes a cylindrical surface and a flat surface that contacts the flat surface 92, which prevents the output arm 12 to rotate with respect to the servo output shaft 9. In an alternative embodiment, the servo output shaft 9 may include two opposite flat surfaces 92, and inner lateral surface of the through hole 121 includes two flat surfaces that respectively contact the flat surfaces 92.

In one embodiment, the lower portion of the servo output shaft 9 includes a stopper portion 91 that is used to prevent an axial movement of the output arm 12. Specifically, the stopper portion 91 is a shaft section that has a diameter larger than the diameter of the lower portion, forming a shoulder therebetween. The shoulder contacts the top of the portion of the output arm 12 that is received in the cutout 101. In the embodiment, the shoulder is located within the cutout 101.

In one embodiment, the output arm 12 defines a mounting hole 122 in a distal end that is away from the end arranged within the housing 100. The mounting hole 122 extends in a direction that is perpendicular to the extending direction of the through hole 121. The mounting hole 122 is used for mounting the servo on components of other machines or connecting the servo with another servo. The shape and size of the mounting holes 122 can vary according to actual needs. For example, the mounting hole 122 may have the same configuration as the through hole 121. The output arm 12 further defines a positioning hole 124 that intersects and communicates with the mounting hole 122. The mounting hole 122 can be a threaded hole.

In one embodiment, the housing 100 includes an upper housing 8, a middle housing 14 and a lower housing 1 that are stacked on one another. The upper housing 8, the middle housing 14 and the lower housing 1 are fixed together via screws. The cutout 101 is defined in the middle housing 14. The PCB 2 and the motor 3 are fixed to the middle housing 14 via screws engaged with the threaded holes of the motor 3. In the embodiment, the servo further includes a first bearing 10 and a second bearing 11 arranged around the servo output shaft 9, a connecting member 13 connected to a lower end of the servo output shaft 9, and a magnet 15 connected to the lower end of the connecting member 13. The first bearing 10 is arranged around the upper portion of the servo output shaft 9 and between the upper housing 8 and the servo output shaft 9. The second bearing 11 is arranged around the middle portion of the servo output shaft 9 and between the middle housing 14 and the servo output shaft 9. The magnet 15 is fixed to the connecting member 13 by press riveting.

In one embodiment, the gear transmission mechanism comprises a first-stage shaft 18 and a second-stage shaft 19, a motor gear 4, a servo gear 20, a first gearset 5, a second gearset 6 and a third gearset 7. The first-stage shaft 18 and the second-stage shaft 19 are parallel to the servo output shaft 9. The motor gear 4 is arranged around the motor output shaft of the motor 3. The servo gear 20 is arranged around the servo output shaft 9 at an end away from the PCB 2. The first gearset 5 and the third gearset 7 are arranged around the first-stage shaft 18. The second gearset 6 is arranged around the second-stage shaft 19. The motor gear 4, the first gearset 5, the second gearset 6, the third gearset 7 and the servo gear 20 are sequentially engaged with one another.

Specifically, the first gearset 5, the second gearset 6 and the third gearset 7 each includes a big gear and a small gear that are fixed to and coaxial with each other. The big gear of the first gearset 5 is engaged with the motor gear 4. The big gear of the second gearset 6 is engaged with the small gear of the first gearset 5. The small gear of the second gearset 6 is engaged with the big gear of the third gearset 7. The small gear of the third gearset 7 is engaged with the servo gear 20. In the embodiment, the big gear has a diameter larger than the diameter of the small gear.

In one embodiment, the small gears of the first gearset 5 and the second gearset are respectively located above the big gears of the first gearset 5 and the second gearset 6, and the small gear of the third gearset 7 is located under the big gear of the third gearset 7, which is conducive to saving the internal space of the servo. The second gearset 6 further includes a protruding portion 61 protruding from the big gear thereof. The small gear of the second gearset 6 protrudes from the top of the protruding portion 61. It can save the cost by arranging the protruding portion 61 between the big gear and small gear of the second gearset 6.

The working principle of the servo of the embodiment is as follows: The PCB 2 sends an instruction to drive the motor 3 to rotate. The motor 3 then drives the motor gear 4 to rotate, and the motor gear 4 drives the first gearset 5, the second gearset 6, the third gearset 7 and the servo gear 20 to rotate. The servo gear 20 drives the servo output shaft 9 to rotate. The servo output shaft 9 then drives the output arm 12 to rotate, which allows the output arm 12 to drive another component connected thereto to rotate. The rotation plane of the output arm 12 is perpendicular to the servo output shaft 9. The range of rotation of the output arm 12 is about 180 degrees. In other embodiments, the range of rotation of the output arm 12 can vary by changing the configuration of the cutout 101.

One end of the output arm 12 is located within the middle housing 14 at a substantially central position of the housing 100, and the other end can be used to connect with another servo/component, thereby making the structure of the servo compact.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo comprising:
 a housing comprising an upper housing, a middle housing and a lower housing that are stacked on one another, and a lateral side defining a cutout at a substantially central portion of the lateral side;
 a motor, a printed circuit board (PCB) and a servo output shaft that are accommodated within the housing, the motor being electrically connected to the PCB, the motor comprising a motor output shaft, the lateral side being substantially parallel to the servo output shaft;
 a gear transmission mechanism configured to connect the motor output shaft to the servo output shaft, comprising a first-stage shaft and a second-stage shaft that are parallel to the servo output shaft, a motor gear arranged around the motor output shaft, a servo gear arranged around the servo output shaft, a first gearset and a third gearset arranged around the first-stage shaft, and a second gearset arranged around the second-stage shaft;
 an output arm comprising a proximal end that is arranged within the housing through the cutout and defines a through hole through which the servo output shaft passes, and a distal end extending out of the housing to connect with an external component;
 a first bearing arranged around an upper portion of the servo output shaft and between the upper housing and the servo output shaft;
 a second bearing arranged around a middle portion of the servo output shaft and between the middle housing and the servo output shaft;
 a connecting member; and
 a magnet;
 wherein the lower portion of the servo output shaft extends through the through hole with a lower end thereof connected to the connecting member, the connecting member defines a receiving cavity in which the magnet is received, and the magnet is fixed to the connecting member by press riveting;

wherein the motor gear, the first gearset, the second gearset, the third gearset and the servo gear are sequentially engaged with one another, and the first-stage shaft is fixed to the upper housing, and the second-stage shaft is integrally formed with the middle housing, and the cutout is defined at the middle housing.

2. The servo of claim 1, wherein the output arm is rotatable about an axis, and the axis is either same as the servo output shaft, or parallel to the servo output shaft.

3. The servo of claim 2, further comprising a fastening member, wherein the proximal end of the output arm further defines a locking hole intersecting the through hole, and the fastening member is received in the locking hole to fix the output arm to the servo output shaft.

4. The servo of claim 3, wherein a lower portion of the servo output shaft comprises a lateral surface that comprises a cylindrical surface and a flat surface, the through hole is shaped and sized to match the lower portion in such a way that the output arm is rotatable together with the servo output shaft.

5. The servo of claim 4, wherein the servo output shaft comprises a stopper portion that is configured to prevent an axial movement of the output arm.

6. The servo of claim 5, wherein the stopper portion has a diameter larger than the diameter of the lower portion of the servo output shaft, forming a shoulder therebetween, the shoulder is located within the cutout and contacts a top surface of the proximal end of the output arm.

7. The servo of claim 2, wherein the output arm defines a mounting hole in the distal end that is away from the end arranged within the housing.

8. The servo of claim 1, wherein the first gearset, the second gearset and the third gearset each comprise a big gear and a small gear, the big gear of the first gearset is engaged with the motor gear, the big gear of the second gearset is engaged with the small gear of the first gearset, the small gear of the second gearset is engaged with the big gear of the third gearset, and the small gear of the third gearset is engaged with the servo gear.

9. The servo of claim 8, wherein the small gears of the first gearset and the second gearset are respectively located above the big gears of the first gearset and the second gearset, and the small gear of the third gearset is located under the big gear of the third gearset.

* * * * *